(12) United States Patent
Warner et al.

(10) Patent No.: US 9,932,424 B2
(45) Date of Patent: Apr. 3, 2018

(54) COMPOSITIONS AND METHODS FOR COMPATIBILIZING FLUORINATED MATERIALS IN NONFLUORINATED SOLVENT SYSTEMS

(71) Applicant: WARNER BABCOCK INSTITUTE FOR GREEN CHEMISTRY, LLC, Wilmington, MA (US)

(72) Inventors: John Charles Warner, Wilmington, MA (US); Jean R. Loebelenz, Essex, MA (US); Peter N. Kariuki, Bedford, MA (US); David K. Bwambok, Brighton, MA (US)

(73) Assignee: Warner Babcock Institute for Green Chemistry, LLC, Wilmington, MA (US)

( * ) Notice: Subject to any disclaimer, the term of this patent is extended or adjusted under 35 U.S.C. 154(b) by 0 days.

(21) Appl. No.: 14/942,747

(22) Filed: Nov. 16, 2015

(65) Prior Publication Data
US 2016/0304641 A1  Oct. 20, 2016

Related U.S. Application Data

(60) Provisional application No. 62/079,719, filed on Nov. 14, 2014.

(51) Int. Cl.
| | |
|---|---|
| *C08F 116/06* | (2006.01) |
| *C09D 175/04* | (2006.01) |
| *C08G 18/83* | (2006.01) |
| *C09D 129/14* | (2006.01) |

(52) U.S. Cl.
CPC .......... *C08F 116/06* (2013.01); *C08G 18/837* (2013.01); *C09D 129/14* (2013.01); *C09D 175/04* (2013.01)

(58) Field of Classification Search
CPC ............................. C08F 116/06; C09D 175/04
USPC .................................................. 524/104, 503
See application file for complete search history.

(56) References Cited

U.S. PATENT DOCUMENTS

2005/0014749 A1\*  1/2005  Chen ................... C07D 241/08
                                                            514/227.5

FOREIGN PATENT DOCUMENTS

JP        2003-004729     *   1/2003

\* cited by examiner

*Primary Examiner* — Deve E Valdez
(74) *Attorney, Agent, or Firm* — Cermak Nakajima & McGowan LLP; Malcolm K. McGowan

(57) ABSTRACT

A copolymer of polyvinyl alcohol and trifluoro acetaldehyde derivatized to have a substituent that contains fluorine. Such compositions are useful in compatibilizing fluorinated molecules that are to be blended into liquid materials or systems, as well as materials and systems that may be aerosolizable or foamable liquids.

8 Claims, 19 Drawing Sheets

10% [50% 4/2 FPOSS: 50% PVA/TFAA] in paint

25% [50% 4/2 FPOSS: 50% PVA/TFAA] in paint

COMPOSITIONS AND METHODS FOR COMPATIBILIZING FLUORINATED MATERIALS IN NONFLUORINATED SOLVENT SYSTEMS

CROSS-REFERENCE TO RELATED APPLICATION

This application claims benefit of copending U.S. provisional patent application No. 62/079,719, filed Nov. 14, 2014, entitled COMPOSITIONS AND METHODS FOR COMPATIBILIZING FLUORINATED MATERIALS IN NONFLUORINATED SOLVENT SYSTEMS, and commonly assigned to the assignee of the present application, the disclosure of which is incorporated by reference in its entirety herein.

FIELD

The present disclosure relates to compositions and methods for rendering fluorinated materials more compatible with nonfluorinated solvent systems. In exemplary embodiments, compositions are provided which provide desirable properties and which can be compatibilized in nonfluorinated solvent systems. In exemplary embodiments, methods are provided for derivatizing polymers with a fluorinated substrate and blending such materials into other materials.

BACKGROUND

Introducing desirable molecules into a liquid material to improve the material's properties requires even dissociation or dispersion of the molecules in the liquid. If the molecules are not normally dispersible, or only partially dispersible, the result of incomplete or ineffective dispersion can be a heterogeneous, rather than a desired homogeneous, mixture. Heterogeneity can create points or areas of instability in the material where failure can occur. Formulating a paint material with a fluorinated material has heretofore been difficult because the strong attraction of the fluorinated molecule to itself reduces the dissociation in the paint base and often results in aggregation or phase separation, which provides aesthetically unpleasing coating, and also reduces the desirable properties of the paint, such as, but not limited to, surface texture, smoothness, reflectivity, durability, abrasion resistance, and the like.

For example, in paint composition materials it may be desirable to introduce molecules that improve hydrophobicity so that the surface coated with the paint has a greater ability to repel water. Such molecules may include, but are not limited to, fluorinated polymers. One example are fluorinated polyhedral oligomeric silsesquioxane ("F-POSS") polymer molecules, which are a subclass of polyhedral oligomeric silsesquioxanes ("POSS") and consist of a silicon-oxide core $[SiO_{1.5}]$ with a periphery of long-chain fluorinated alkyl groups. Such alkyl groups include fluorinated triethoxysilanes. F-POSS molecules possesses one of the lowest known surface energies leading to the creation of superhydrophobic and oleophobic surfaces. A feature of F-POSS material is that it ordinarily forms a siloxy cage that acts like an inorganic glass-like material, but have organic R group substituents at the matrix apices, which provides unusual properties and applications. See formula [1] below.

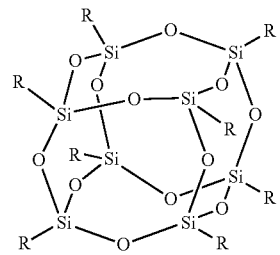

[1]

Blending F-POSS into conventional paints is problematic because the fluorine atoms of neighboring F-POSS molecules have a tendency to attract each other resulting in F-POSS molecules not typically being readily dispersible or dissociable in other materials. F-POSS molecules typically have low solubility in non-fluorinated solvents. It would be desirable to have an F-POSS material that was more easily dispersed or dissociated in other materials.

The phase separations that can occur when trying to blend fluorinated molecules into a paint or other liquid material may result in imposed heterogeneity, which can be disastrous as some regions may be more hydrophobic or oleophobic than others. The lattice energy of the matrix of the heterogeneous paint material can result in formation of crystallites, which cause phase anomalies and points of instability where failure can occur. In paint compositions, such failures may cause cracking, delamination, peeling, and other failures.

It would be desirable to have a method for compatibilizing the molecule to be added to the material so as to achieve as much dissociation as possible and to form a homogeneous mixture.

High abrasion resistance is often a key attribute of paint materials that are applied to a surface that will be subject to abrasion forces. A smoother surface contributes to increasing abrasion resistance. Abrasion resistance is improved with paint materials where the coated surface has a more homogenous and, therefore, smoother finish. Paint materials that are relatively heterogeneous present a rougher finish and are less abrasion resistant. It would be desirable to have a paint or coating material having high hydrophobicity and/or oleophobicity that also possesses high abrasion resistance.

Fluorinated materials have the drawback of being environmentally unfriendly. Paint, coating or other materials or systems that contain fluorinated materials, while they may have improved hydrophobicity and/or oleophobicity, may not be as environmentally friendly as desirable. It would be desirable to reduce the amount of fluorinated materials in paint, coating or other materials and systems yet retain the desirable hydrophobicity, oleophobicity and/or other properties such materials and systems possess.

It is believed that heretofore F-POSS materials have been formed having only one molecule as the R substituent for all apices. The fluorine atoms of neighboring F-POSS molecules have a tendency to attract each other resulting in F-POSS molecules not typically being readily dispersible or dissociable in other materials. F-POSS molecules typically have low solubility in non-fluorinated solvents. It would be desirable to have an F-POSS material that was more easily dispersed or dissociated in other materials.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In exemplary embodiments, provided is a composition comprising a copolymer of polyvinyl alcohol and trifluoro acetaldehyde.

In exemplary embodiments, provided is a composition comprising poly (4, 6-methylenyl-1,3-dioxan-2-trifluoromethyl)-vinylalcohol.

In exemplary embodiments, provided is a mixture for compatibilizing fluorinated molecules in non-fluorinated materials or systems, the composition comprising a copolymer of polyvinyl alcohol and trifluoro acetaldehyde and a fluorinated material. In exemplary embodiments, the fluorinated material is a fluorinated polyhedral oligomeric silsesquioxane.

In exemplary embodiments, provided is a fluorinated paint composition, comprising a mixture of polyvinyl alcohol derivatized with trifluoro acetaldehyde; an F-POSS material; and, a polyurethane-based paint system. In exemplary embodiments, the F-POSS material is 6/2 F-POSS and the ratio of F-POSS to PVA-TFAA is 1:1, and wherein the 6/2 F-POSS and PVA-TFAA is provided as a mixture such that the mixture is 10% and the polyurethane paint system is 90%.

In exemplary embodiments, provided is a method of compatibilizing fluorinated molecules into a non-fluorinated material or system, comprising (1) dissolving polyvinyl alcohol in a polar solvent to form a solution; (2) adding trifluoro acetaldehyde hydrate and p-toluene sulfonic acid to the dissolved polyvinyl alcohol solution of step (1); and (3) mixing the mixture of step (2) under conditions adapted to form PVA-TFAA polymer.

In exemplary embodiments, provided is a method of compatibilizing a fluorinated material into a nonfluorinated solvent system, the method comprising mixing PVA-TFAA with a fluorinated material to form a mixture; and, mixing the mixture of step a) with a nonfluorinated solvent system. In exemplary embodiments, the F-POSS material is 6/2 F-POSS and the ratio of F-POSS to PVA-TFAA is 1:1, and the 6/2 F-POSS and PVA-TFAA is provided as a mixture such that the mixture is 10% and the polyurethane paint system is 90%.

In exemplary embodiments, provided is a method of compatibilizing fluorinated molecules into a non-fluorinated material or system, comprising (1) dissolving polyvinyl alcohol in a polar solvent to form a solution; (2) adding trifluoro acetaldehyde hydrate and p-toluene sulfonic acid to the dissolved polyvinyl alcohol solution of step (1); and (3) mixing the mixture of step (2) under conditions adapted to form PVA-TFAA polymer.

In exemplary embodiments, provided is a method of compatibilizing a fluorinated material into a non-fluorinated solvent system, the method comprising (1) mixing PVA-TFAA with a fluorinated material to form a mixture; and, (2) mixing the mixture of step (2) with a nonfluorinated solvent system.

In exemplary embodiments, provided is a method of compatibilizing a fluorinated material into a polyurethane paint system, the method comprising (1) mixing PVA-TFAA with a fluorinated material to form a composition of PVA-TFAA having F-POSS as a substituent in at least one location thereon; and, (2) mixing the composition of step (1) with a polyurethane paint system to form a paint formulation, wherein the composition of step (1) is substantially uniformly dispersed in the paint formulation.

Other features will become apparent upon reading the following detailed description of certain exemplary embodiments, when taken in conjunction with the appended claims.

BRIEF DESCRIPTION OF THE DRAWINGS

The drawings disclose exemplary embodiments in which like reference characters designate the same or similar parts throughout the figures of which.

DETAILED DESCRIPTION

Figure 1:
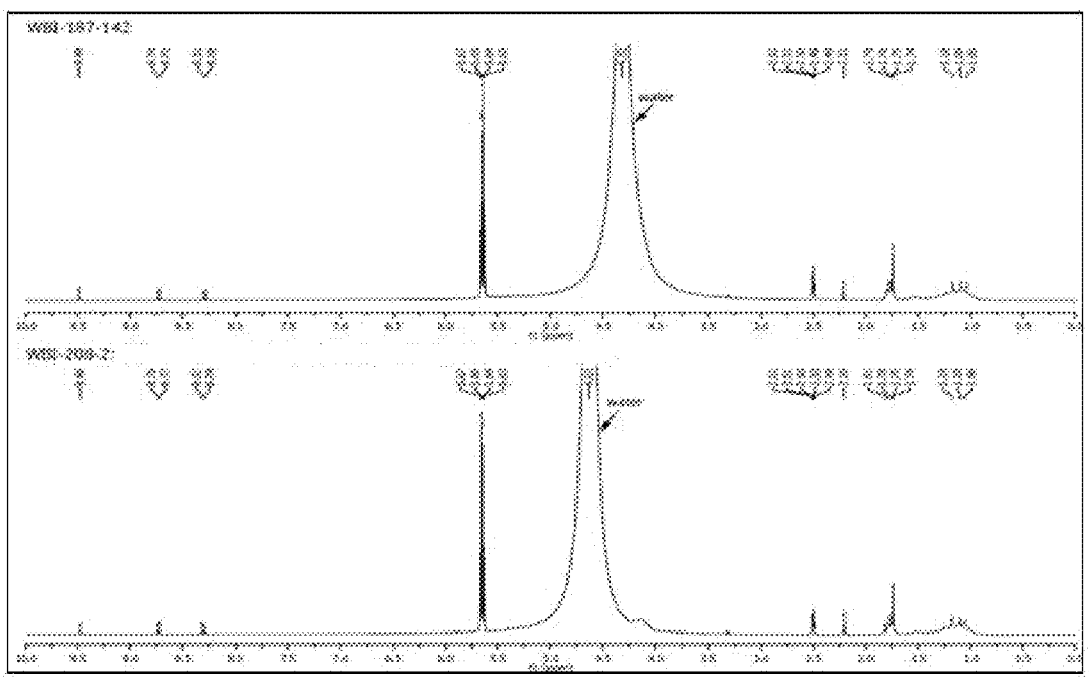
FIG. 1 shows graphs of NMR plots of two samples of a TFAA-modified PVA polymer made from 10% PVA with 25% TFAA polymer.

In exemplary embodiments, novel compositions are provided comprising a polymer derivatized to have a substituent that contains fluorine. Such compositions are useful in compatibilizing fluorinated molecules that are to be blended into liquid (or semi-liquid, gel, cream or the like) materials or systems, as well as materials and systems that may be aerosolizable or foamable liquids. It is to be understood that the term "system" is intended to include a single molecule compositions as well as compositions that have two or more different molecules. For example, but not by way of limitation, a paint or coating system may comprise a polymer-based paint combined with a resin, and may include tinting, coloring and/or other materials.

In exemplary embodiments, such materials or solvent systems are non-fluorinated. In exemplary embodiments, the liquid material is a paint or coating material or system. In exemplary embodiments, the material is a polymer-based paint or coating material or system. In exemplary embodiments, the polymer base may comprise one or more polyurethanes, polystyrenes, polyethylenes, polyethers, polyolefins, oxides, polyesters, cellulosic compositions, blends of two or more of the foregoing, and the like. In exemplary embodiments, the material into which the polymer is compatibilized may be a material that provides stain, oil and/or water resistance. In exemplary embodiments, the material may include stains, sealants, varnishes, fillers, waxes, or the like. In exemplary embodiments, the material may include extruded plastics, such as, but not limited to, those used in compounded, injected or cast systems.

In exemplary embodiments, polyvinyl alcohol (PVA) polymer is modified by reaction with trifluoro acetaldehyde (TFAA) hydrate and a catalyst to form a fluorinated PVA-TFAA polymer. In one exemplary embodiment, p-toluene sulfonic acid (tosic acid) is used as a catalyst. The material bridges two materials of opposite wettability. PVA is a hydrophilic material that is heavily hydroxylated (OH). TFAA is fluorinated and has hydrophobic functionality. When the materials are combined, a thermodynamically stable ring is formed. The combination of the materials allow F-POSS to be delivered and dissolved in polyurethane systems without the use of a fluorinated solvent, but rather using commonly used organic solvents (such as, but not limited to, toluene, methyl ethyl ketone, isopropyl alcohol (IPA), and the like). The reaction equation for this exemplary embodiment is shown in equation [2] below.

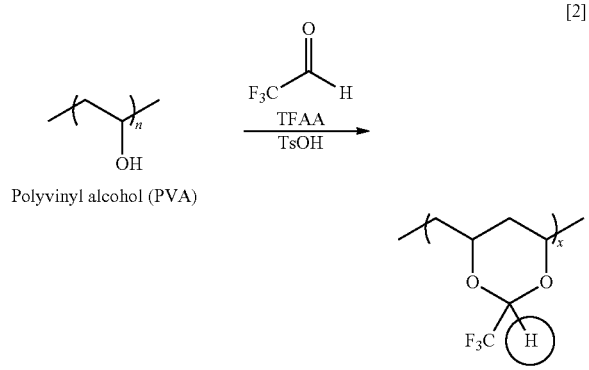

[2]

The fluoro-groups will interact with the F-POSS and form a compatible system. The two oxygen groups in the ring have hydrophilicity and will interact with the polyurethane backbone in the carbamate groups (R—NCOO—R) as shown below in equation [3].

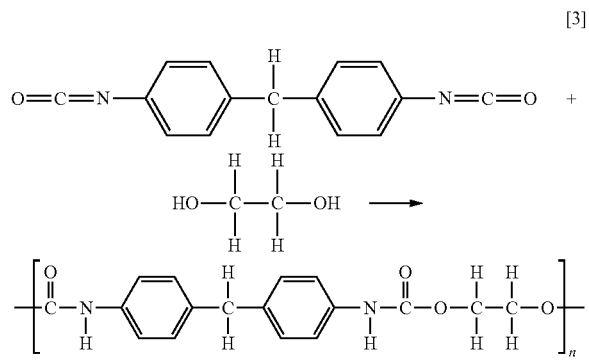

[3]

While not wishing to be bound by a particular taxonomical expression, a material formed according to exemplary embodiments may be referred to as poly (4, 6-methylenyl-1,3-dioxan-2-trifluoromethyl)-vinylalcohol.

One feature of the above-described PVA-TVAA oligomer composition is that it is formed by a one-step reaction process.

In one exemplary embodiment, 10 wt % PVA polymer (MW ~2,000-6,000, 78% hydrolyzed) is reacted with 25 wt % TFAA with 0.5 wt % tosic acid, resulting in partial fluorination of the PVA polymer.

In exemplary embodiments, the TFAA-modified PVA polymer (PVA-TFAA compatibilizing polymer) can be blended with fluorinated materials into paint or coating materials or systems. In exemplary embodiments, the fluorinated material is an F-POSS molecule. Examples discussed hereinbelow show that the combination of the PVA-TFAA compatibilizing polymer and F-POSS molecule when blended into a polyurethane-based paint material resulted in a higher water contact angle than when F-POSS was blended into the paint without the PVA-TFAA compatibilizing polymer. The results show that the compatibilizing polymer helped to improve the overall surface energy of the F-POSS-containing paint coating. Oleophobicity of the F-POSS blended paint, as measured by water contact angle, also increased with the use of the PVA-TFAA compatibilizing polymer.

In exemplary embodiments, methods are provided for compatibilizing fluorinated materials that are to be blended into non-fluorinated materials or systems. In exemplary embodiments, methods are provided for compatibilizing fluorinated materials that are to be blended into hydrogen-bonding water soluble polymer materials or systems.

In one exemplary embodiment of a method, PVA is modified with TFAA as described herein to form a PVA-TFAA polymer having a substituent that contains fluorine. Into a paint system is mixed the PVA-TFAA compatibilizing polymer and a fluorinated material, such as, but not limited to an F-POSS. In exemplary embodiments, the F-POSS is 6/2 F-POSS or 4/2 F-POSS. In one exemplary embodiment of a method, PVA is modified with TFAA such that at least a portion of the —OH groups in PVA are replaced by at least one fluorine or fluorinated group. By adjusting the starting materials and reaction conditions, the extent of fluorine substitution in the PVA polymer can be affected. The adjustment of the fluorination can be used to design a compatibilizing polymer that can be optimized for blending with different fluorinated materials to improve the compatibilization into other materials or systems, such as paints and coatings.

In one broad aspect, exemplary embodiments disclosed herein provide a novel copolymer composition (e.g., PVA-TFAA) comprising a first monomer A (e.g., PVA) that is compatible with a first phase (e.g., an OH-based system, such as a polyurethane-based paint), and a second monomer B (e.g., a fluorine-based material, such as TFAA) that is compatible with a material (e.g., F-POSS or other fluorinated material) that is to be blended into the first phase, but which is typically either not compatible or minimally compatible with the first phase. The polymer composition formed therefrom is compatible (i.e., substantially dispersible and stable) in the first phase.

A feature of the use of the compatibilizing polymers described herein with fluorinated material (such as F-POSS) in nonfluorinated solvent systems, such as, but not limited to, paint or coating materials or systems, is that less fluorinated material may be needed to achieve the same hydrophobicity and/or oleophobicity (or other property), thereby providing a more environmentally friendly product.

One issue with F-POSS coatings from a commercial standpoint is the durability of the system, since thin nanocoatings are usually not robust enough to meet market demand. As such, the ability to integrate F-POSS in very thick polyurethane resins (for example, several hundred microns thick (or more) used in heavy industrial applications), means the F-POSS properties will be present even if a large portion of the thick paint degrades over time in harsh environments. A feature of the presently disclosed novel compositions described herein is that a creates a three-dimensional dispersion of F-POSS in polyurethane systems. This may result in increased durability of the system.

In exemplary embodiments, the oligomer compositions described herein may be used in many different polyurethane systems, whether paint-based or otherwise. In exemplary embodiments, the oligomer compositions described herein may be used to provide protection to plastics without the use of coating or expensive lesser-performing materials, such as PVDF or PCTFE. In exemplary embodiments, the oligomer compositions described herein may be used in drug discovery and development.

A feature of the presently disclosed compatibilizing polymers described herein with fluorinated material (such as F-POSS) in paint or coating materials or systems is that other properties may possibly be improved, such as, but not limited to, durability, abrasion resistance, surface tension, dispersibility, luster, shine, reflectivity, anti-biofouling, fire retardance, and the like.

Another feature is that materials coated or incorporating blends of the presently disclosed compatibilizing polymers and fluorinated materials may provide decreased water and/or gas permeability. This may be because the fluorinated material is more effectively dispersed into the other material by blending it with the compatibilizing polymer as described herein, thus making the blended material more homogeneous, which may reduce the amount and/or size of channels in the coating and reduce the ability of liquids or gas to pass through the material.

A feature of exemplary embodiments of the composition and method disclosed herein is that the compositions can be used in systems that can be applied to or integrated in flooring, ceilings, biological devices, antimicrobial systems, or the like. Exemplary embodiments of the compositions may be useful in imaging, such for coating a printing screen such that certain areas of the screen that are coated with materials containing the compatibilized polymers described in exemplary embodiments herein avoid picking up the ink or other material that is laid down on the screen.

The following examples are set forth for purposes of illustration only. Parts and percentages appearing in such examples are by weight unless otherwise stipulated.

EXAMPLES

Example 1

To improve the compatibility of the F-POSS in paint, a mildly fluorinated polymer solution was developed using low molecular weight polyvinyl alcohol (PVA) and trifluoro acetaldehyde (TFAA) hydrate.

We believe that a partially hydrolyzed polymer matrix would function by supporting the caged F-POSS molecule along the polymer strand when incoporated into paint by providing a support matrix.

Example 1A

Synthesis of PVA-TFAA

In a typical procedure, a 10 wt % low molecular weight PVA polymer sample ($M_w$~2000-6000 78% hydrolyzed) was dissolved in water at room temperature. 25 wt. % of trifluoro acetaldehyde hydrate was added to the PVA solution followed by 0.5 wt % p-toluene sulfonic acid as a catalyst. The mixture was left to mix overnight by slow tumbling (rotation) for effective mixing and to reduce the introduction of air bubbles. The reaction depicted in equation [4] below was carried out to prepare the polymer solution to be used as a mixture with F-POSS in paint.

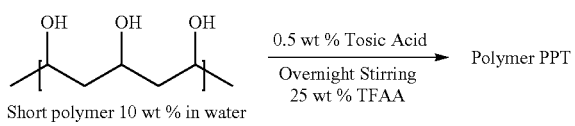

[4]

The resulting solution was viscous and homogeneous, with its idealized structure of the modified polymer shown in Example 1B below.

Example 1B

Characterization of PVA-TFAA From Example 1A

1H-NMR for the 10% PVA+25% TFAA polymer were performed on two individual batches of polymer solution in DMSO-d6 using a JEOL AS400 MHz NMR to confirm the reproducibility of the reaction. Chemical shifts were reported in part per million (δ ppm).

While its not possible to quantify how much of the PVA became fluorinated at this point, there is a definite peak for the proton (circled) adjacent to the —CF3 group in the product (shift 5.67-5.63 ppm) (see equation [5], in particular the circled H).

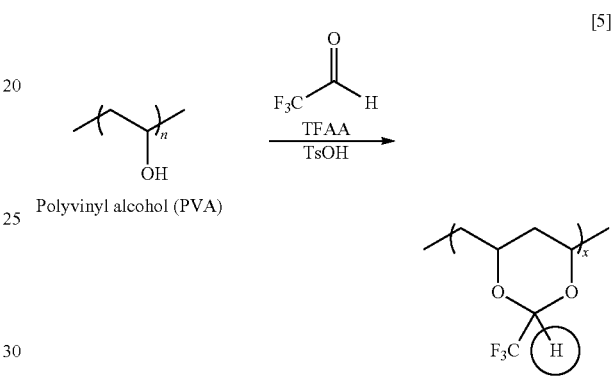

[5]

Also, the spectra for the two products, 187-142 and 208-2, confirm that the reaction is reproducible. See FIG. 1 (which is 1H-NMR for the 10% PVA+25% TFAA polymer).

Example 2

6/2 F-POSS With Modified Polyvinyl Alcohol

Example 2A

Formulation of 6/2 F-POSS with Modified PVA in Paint

Two-component paint was prepared according to manufacturer's directions by mixing Windmastic TopCoat Repair Kit 7035 Grey Part A base paint (Carboline, UN1293) (a polyurethane-based paint) with Windmastic TopCoat Repair Kit Part B Resin (Carboline, UN1866) 6:1(v/v). To ensure accurate measurements of paint, six volumes (mLs) of Part A were weighed several times and the weights averaged 8.6 g; one volume (mL) of Part B was weighed several times averaging 0.97 g. Weight-to-weight ratios were then used throughout each experiment for the formulation of the control paint. The 2 component paint (8.6 g of Part A and 0.97 g of Part B) were added to a Flacktek Speedmixer 10 mL polypropylene translucent container. The paint was then mixed for 10 minutes at 2700 rpm in the Flacktek DAC400 FVZ Speedmixer.

6/2 F-POSS was then blended with the modified PVA solution prepared above at ratios of 3:1, 1:1 and 1:3, and subsequently loaded from 0 to 50 wt % into paint. The containers, including the paint only control and 100% modified PVA polymer in paint, were then placed into the Flacktek Speedmixer for 10 minutes at 2700 rpm. Each formulation was then coated onto 4"×4" QPanel 0.32 inch Dull matte finish steel plates (Guardco) using a 4 mil coating bar. The plates were dried overnight at room temperature.

Interestingly, the addition of only modified PVA loaded into paint at a concentration of 50 wt % caused the paint to become uncoatable. No ill effects were observed with the other combinations containing the modified PVA.

Example 2B

Performance of 6/2 F-POSS With Modified PVA in Paint

Figure 2:
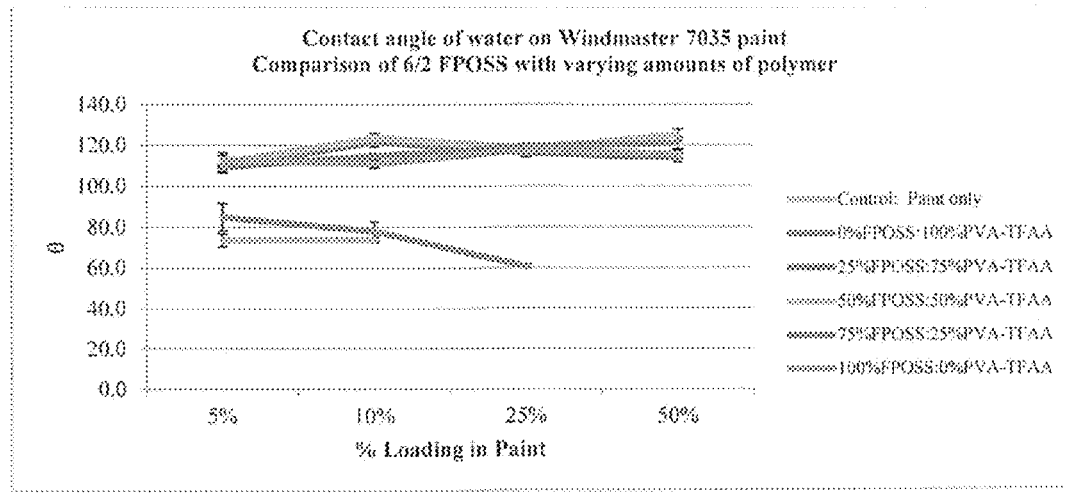
FIG. 2 is a graph of the contact angle of water on paint with varying amounts of 6/2 F-POSS with different amounts of modified TFAA-modified PVA.

Contact angles of water were measured using a Krauss DSA100S drop shape analyzer with an automatic syringe dispenser in 5 uL volumes. Contact angles of hexadecane were measured using the same instrument fitted with a manual syringe dispensing similar volumes. See FIG. 2 (Contact angle of water on paint with varying amounts of 6/2 F-POSS+/−Polymer).

The hydrophobicity of the coatings with 6/2 F-POSS in combination with modified PVA at a 50:50 mixture when loaded into paint at 10 wt % and 50 wt % (contact angles of 124 and 125, respectively) displayed improvement over 6/2 F-POSS alone (contact angles of 111 and 116). See FIG. 3 (Contact angle of hexadecane on paint with varying amounts of 6/2 F-POSS+/−polymer). Encouraging results were also observed with 25:75 mixture of F-POSS/Polymer at 10 wt % loading into the paint (contact angle of 122°). These results shows that the polymer has an effect in improving the overall surface energy of the coating when its mixed with the F-POSS compound.

Figure 3:
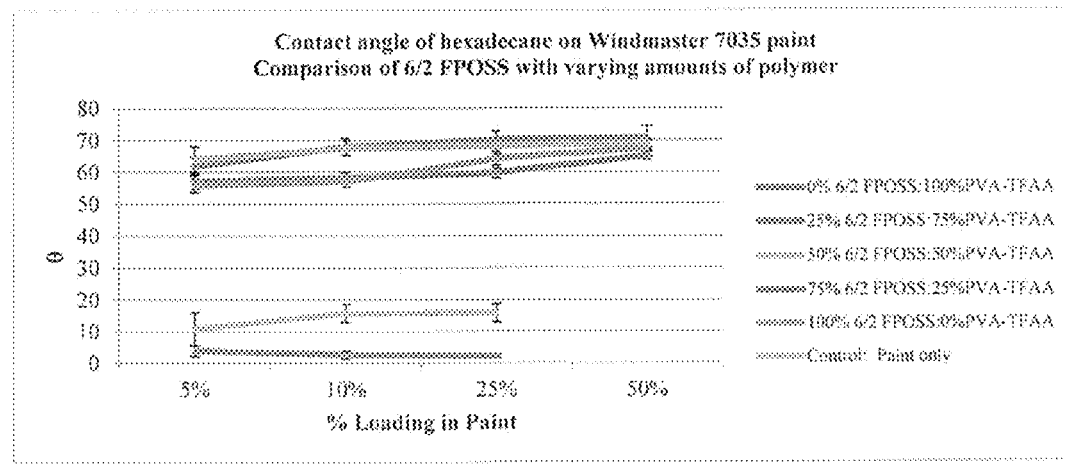
FIG. 3 is a graph of the contact angle of hexadecane on paint with varying amounts of 6/2 F-POSS with different amounts of modified TFAA-modified PVA.
Figure 4A:
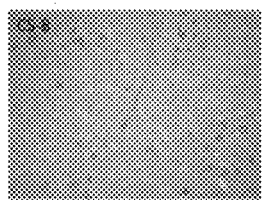
FIG. 4A is a photograph of the results of abrasion testing of paint samples coated with a 10% mixture of 6/2 F-POSS blended with TFAA-modified PVA in paint for the sample labeled CS-8.
Figure 4B:
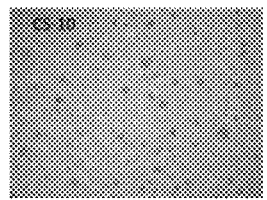
FIG. 4B is a photograph of the results of abrasion testing of paint samples coated with a 10% mixture of 6/2 F-POSS blended with TFAA-modified PVA in paint for the sample labeled CS-10.
Figure 4C:
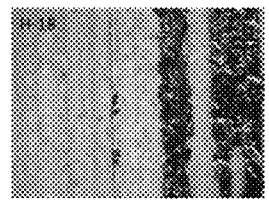
FIG. 4C is a photograph of the results of abrasion testing of paint samples coated with a 10% mixture of 6/2 F-POSS blended with TFAA-modified PVA in paint for the sample labeled H-18.
Figure 4D:
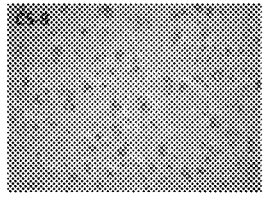
FIG. 4D is a photograph of the results of abrasion testing of paint samples coated with a 25% mixture of 6/2 F-POSS blended with TFAA-modified PVA in paint for the sample labeled CS-8.
Figure 4E:
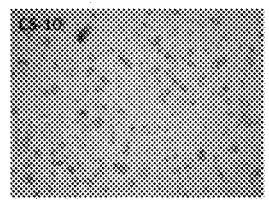
FIG. 4E is a photograph of the results of abrasion testing of paint samples coated with a 25% mixture of 6/2 F-POSS blended with TFAA-modified PVA in paint for the sample labeled CS-10.
Figure 4F:
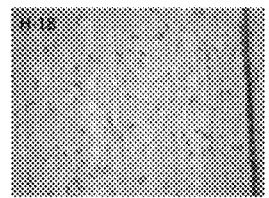
FIG. 4F is a photograph of the results of abrasion testing of paint samples coated with a 25% mixture of 6/2 F-POSS blended with TFAA-modified PVA in paint for the sample labeled H-18.

The oleophobicity results of FIG. 3 discussed above show that the 50:50 and 25:75 mixtures of F-POSS and modified PVA incoporated into paint at all concentrations gave above averge contact angles, ranging from 62°-71°. The modified PVA alone caused the oleophobicity of the paint to decrease significantly.

The improvements observed in surface energy by the addition of the modified polymer indicate that the polymer matrix is indeed interacting in a positive way with the 6/2 F-POSS to create a more hydrophobic and oleophobic surface. This could result in a significant cost savings by reducing the amount of 6/2 F-POSS required to produce a similar effect and result in a more environmentally friendly product.

Example 3

Abrasion Testing of Coated Paint Samples with Modified PVA

The following samples were subjected to abrasion testing using the Taber abrasion tester with 3 Weareraser tips of varying aggressiveness:
  10% [50% 6/2 F-POSS:50% PVA-TFAA] in paint
  25% [50% 6/2 F-POSS:50% PVA-TFAA] in paint
  Tips tested (in order of hardness): CS-8<CS-10<<H-18
  Number of rubs: 0, 30, 60, 90, 120, and 150 (for H-18) or 180 (for CS-8 and CS10)
  Rate of rubbing: 30 cycles/min
  Contact angles for water were measured using a Krauss DSA100S drop shape analyzer with an automatic syringe dispenser in 5 uL volumes. Each surface was measured after each cycle of abrasion then allowed to dry fully before the next abrasion cycle was performed. Images of the rubbed surfaces were taken under optical microscope with a 50× magnification after 120 cycles.

Rubbing with the harshest H-18 tip resulted in stripping away the paint to different extents, as seen in the photographs in FIGS. 4A-F (Abrasion Testing: 120 rubs @30 cycles/min). With the much milder CS-8 and CS-10 tips, the surfaces stayed quite smooth even after 180 rubs.

Figure 5:
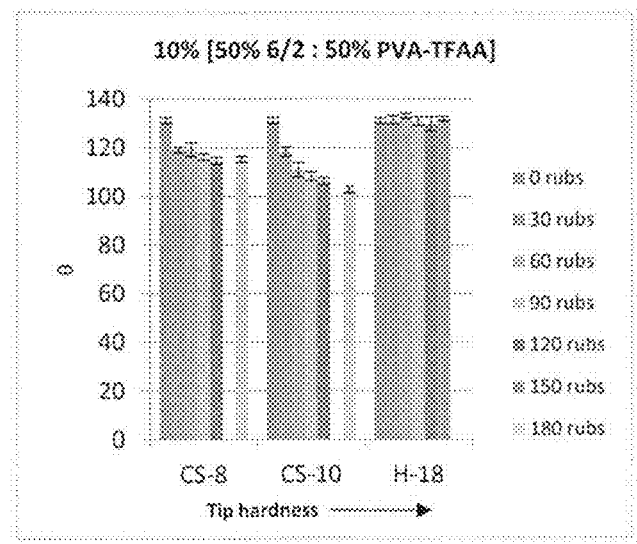
FIG. 5 is a chart of contact angles for different rubbing as part of abrasion resistance testing of the 10% mixture of 6/2 F-POSS blended with TFAA-modified PVA in paint of FIGS. 4A-C.
Figure 6A:
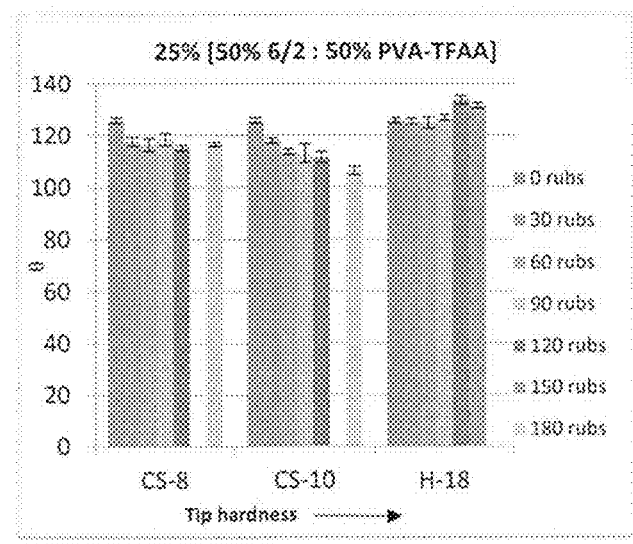
FIG. 6A is a chart of contact angles for different rubbing as part of abrasion resistance testing of the 25% mixture of 6/2 F-POSS blended with TFAA-modified PVA in paint of FIGS. 4D-F.

The contact angles for each rubbing were plotted for each of the three tips, as shown in FIG. 5 (10% [50% 6/2:50% PVA-TFAA]) and FIG. 6A (25% [50% 6/2:50% PVA-TFAA]).

For 10% and 25% loading of the 6/2 F-POSS/polymer in paint, the contact angle on the abraded surface using the softer CS-8 still appears to be leveling off after 180 rubs. A slight decrease was observed after 180 cycles with the CS-10 tip. With regards to the abrasion using the harshest H-18 tip, the paint containing 25% loading of the 6/2 F-POSS-Polymer formulation appeared quite durable compared to the other samples. Although the surface had gouges after 150 cycles, the paint had not abraded to show the base steel and the contact angles were stable.

Figure 6B:
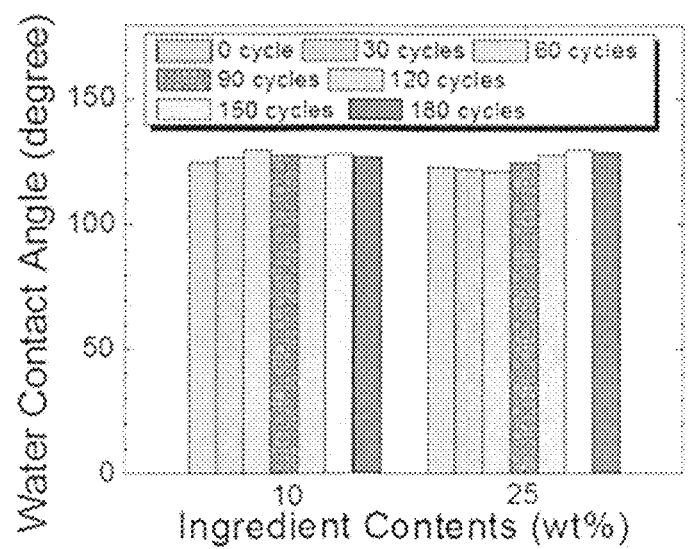
FIG. 6B is a chart of water contact angles for different rubbing as part of abrasion resistance testing.

In the data and graph shown in FIG. 6B, various cycles were run. By the end of the testing, almost nearly all of the industrial paint (supposed to last 10+ years) was degraded off. But can be seen, the water contact angles are almost identical to those from before abrasion testing, demonstrating no appreciable loss of performance. This may be because the materials are three-dimensionally integrated.

Example 4

Energy Dispersive Spectrometry

Figure 7:
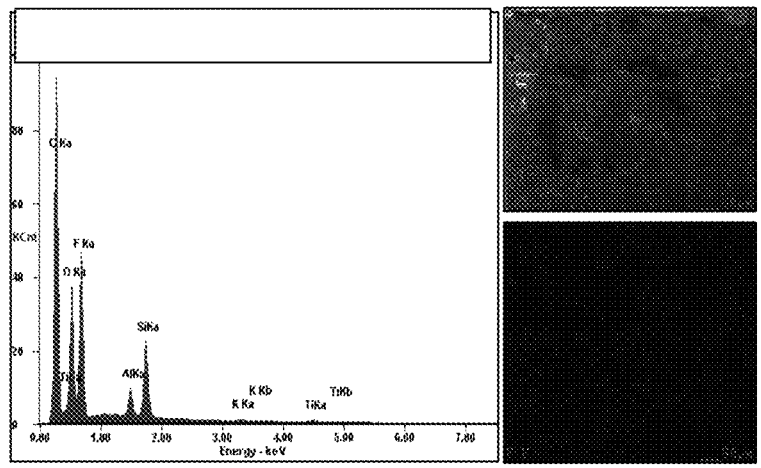
FIG. 7 is a graph of energy dispersive spectrometry analysis of the paint sample of FIGS. 4D-F (25%): MP no abrasion.
Figure 8:
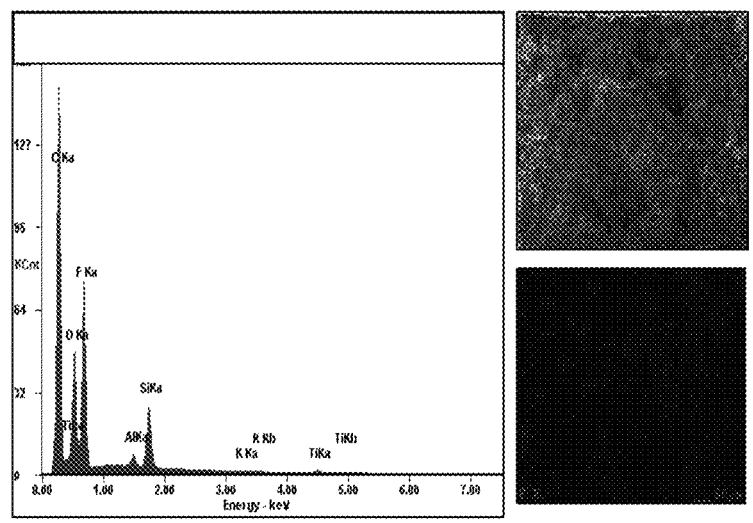
FIG. 8 is a graph of energy dispersive spectrometry analysis of the paint sample of FIGS. 4D-F (25%): MP-CS-8 tip.
Figure 9:
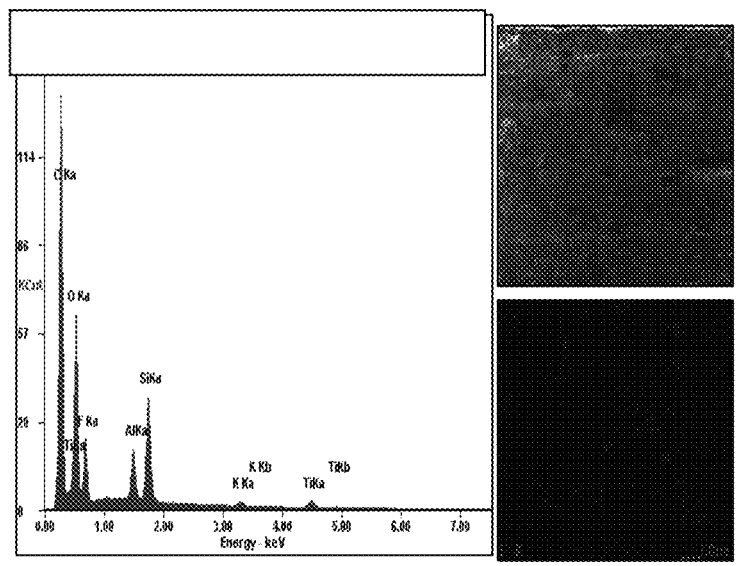
FIG. 9 is a graph of energy dispersive spectrometry analysis of the paint sample of FIGS. 4D-F (25%): MP-CS-10 tip.
Figure 10:
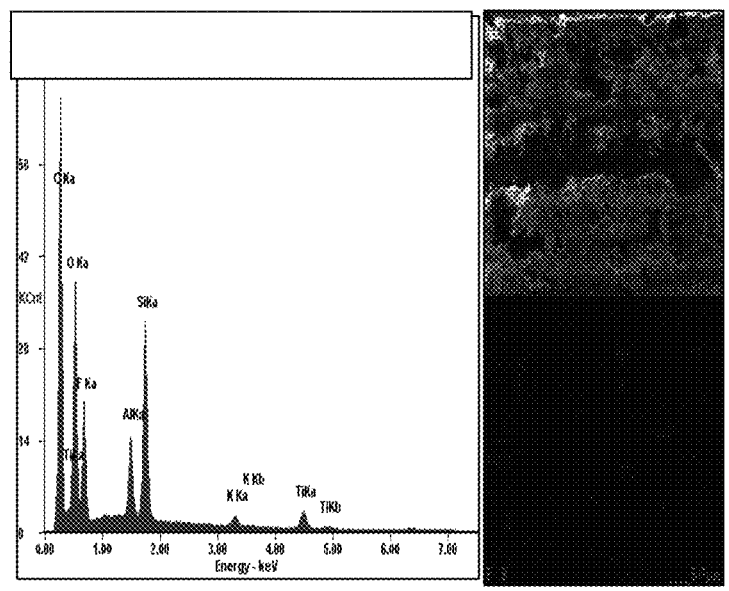
FIG. 10 is a graph of energy dispersive spectrometry analysis of the paint sample of FIGS. 4D-F (25%): MP-CS-18 tip.

Energy Dispersive Spectrometry (EDS) was performed on the paint sample from above containing 25% of the 50:50 blend of 6/2 F-POSS:PVA-TFAA polymer. The following results show the untouched surface (FIG. 7), the surface abraded by a Taber linear abrasion tester for 180 cycles with a gentle and mild tip (CS-8 and CS-10) (FIGS. 8-9), and finally, the surface abraded 150 cycles with a harsh tip (H-18) (FIG. 10). The results indicate that F-POSS is dispersed throughout the layers of the paint although in higher concentrations near the surface. The CS-10 tip may be polishing the surface of the paint causing the observed decrease in contact angle.

Example 5

4/2 F-POSS With Modified Polyvinyl Alcohol

Example 5A

Formulation of 4/2 F-POSS With Modified PVA in Paint in Paint

Two-component paint was prepared according to manufacturer's directions by mixing Windmastic TopCoat Repair Kit 7035 Grey Part A base paint (Carboline, UN1293) with Windmastic TopCoat Repair Kit Part B Resin (Carboline, UN1866) 6:1(v/v). To ensure accurate measurements of paint, six volumes (mLs) of Part A were weighed several times and the weights averaged 8.6 g; one volume (mL) of Part B was weighed several times averaging 0.97 g. Weight-to-weight ratios were then used throughout each experiment for the formulation of the control paint. The 2 component paint (8.6 g of Part A and 0.97 g of Part B) were added to a Flacktek Speedmixer 10 mL polypropylene translucent container. The paint was then mixed for 10 minutes at 2700 rpm in the Flacktek DAC400 FVZ Speedmixer.

4/2 F-POSS was mechanically blended with the modified PVA solution prepared above at ratios of 3:1, 1:1 and 1:3, and subsequently loaded from 0 to 50 wt % into paint. The containers, including the paint only control and 100% modified PVA polymer in paint, were then placed into the Flacktek Speedmixer for 10 minutes at 2700 rpm. Each formulation was then coated onto 4"×4" QPanel 0.32" Dull matte finish steel plates (Guardco) using a 4 mil coating bar. The plates were dried overnight at room temperature.

Interestingly, the addition of only modified PVA loaded into paint at a concentration of 50 wt % caused the paint to become uncoatable. No ill effects were observed with the other combinations containing the modified PVA.

Example 5B

Performance of 4/2 F-POSS With Modified PVA in Paint in Paint

Figure 11:
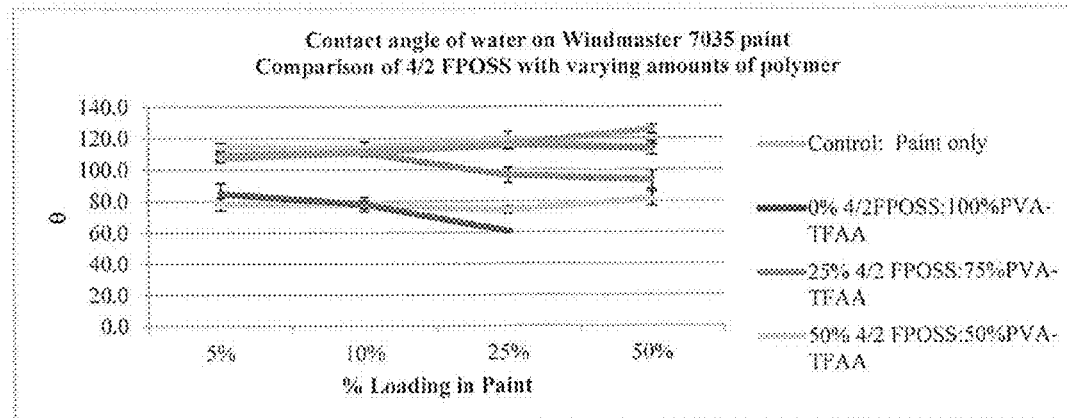
FIG. 11 is a graph of the contact angle of water on paint with varying amounts of 4/2 F-POSS with modified TFAA-modified PVA.

Contact angles of water were measured using a Krauss DSA100S drop shape analyzer with an automatic syringe dispenser in 5 uL volumes. Contact angles of hexadecane were measured using the same instrument fitted with a manual syringe dispensing similar volumes. See FIG. 11 (Contact angle of water on paint with varying amounts of 4/2 F-POSS+/−polymer).

The highest contact angle obtained in this series was with 50wt % loading of the 4/2 F-POSS alone (average of 125°). The drawback to the higher loading of 4/2 F-POSS alone is a very poor quality coating. The incorporation of the 4/2 F-POSS with the modified PVA polymer solution at a 3:1 or 1:1 ratio in the paint resulted in the best quality coatings and contact angles equivalent to using 4/2 F-POSS alone. The use of 100% polymer mixture without the incoporation the 4/2 F-POSS resulted in the contact angles similar to paint alone demonstrating that the inclusion of the 4/2 F-POSS within the polymer matrix is important in helping to lower the surface energy of the paint coatings.

Figure 12:
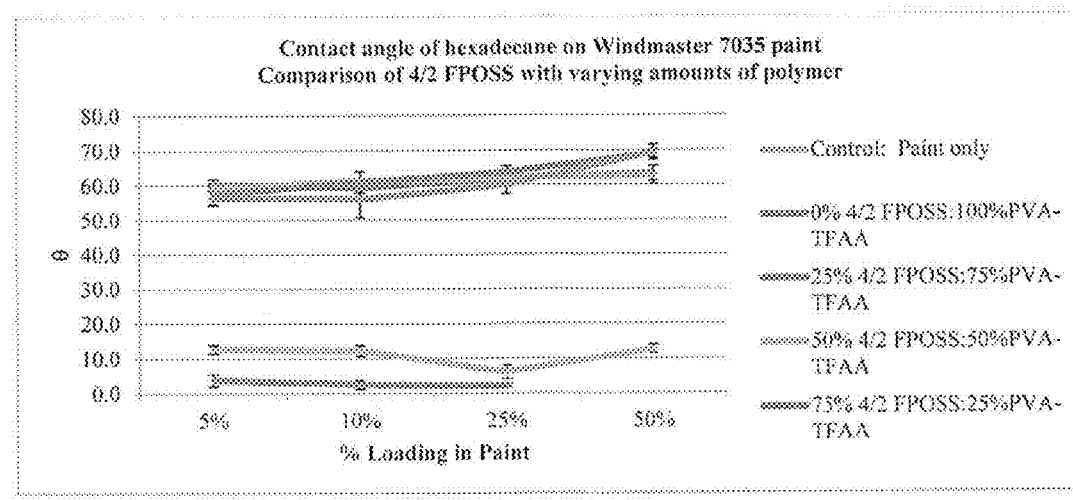
FIG. 12 is a graph of the contact angle of hexadecane on paint with varying amounts of 4/2 F-POSS with modified TFAA-modified PVA.
Figure 13A:
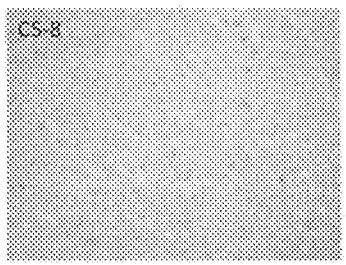
FIGS. 13A-C are photographs of the results of abrasion testing of paint samples coated with a 10% mixture of 4/2 F-POSS blended with different amounts of TFAA-modified PVA in paint.
Figure 13B:
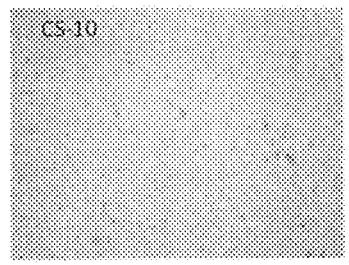
Figure 13C:
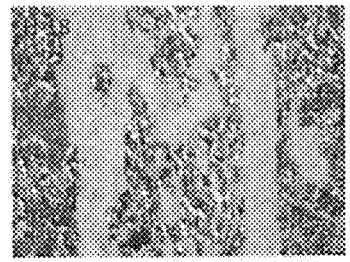
Figure 13D:
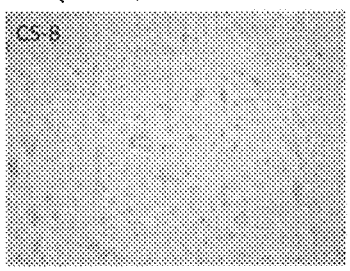
FIGS. 13D-F are photographs of the results of abrasion testing of paint samples coated with a 25% mixture of 4/2 F-POSS blended with different amounts of TFAA-modified PVA in paint.
Figure 13E:
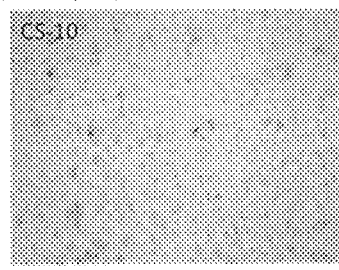
Figure 13F:
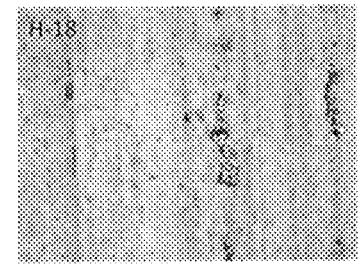

The measurement of the oleophobicity of the paint coatings is shown in FIG. 12. When 4/2 F-POSS was incorporated into the paint alone or as a mixture with modified PVA polymer, the results showed no significant differences (contact angles were within the range of 60°-68°). Again, the incoporation of the PVA/TFAA polymer solution resulted in better quality coatings. Paint alone resulted in low contact angles (below 20°). When 100% of the modified PVA polymer solution was added to the paint the contact angles were much lower (below 5°); in most cases the surfaces wetted so fast when contacted with hexadecane that the contact angles were not measurable.

The addition of the modified PVA polymer solution to the 4/2 F-POSS when incorporated into the paint has allowed for a significant reduction in the amount of 4/2 F-POSS required to achieve the same hydrophobicity and oleophobicity on the surface while not causing a detrimental effect on the coatings themselves.

Example 6

Abrasion Testing of Coated Paint Samples With Modified PVA

The following samples were subjected to abrasion testing using the Taber abrasion tester with 3 Weareraser tips of varying aggressiveness:
  10% [50% 4/2 F-POSS:50% PVA-TFAA] in paint
  25% [50% 4/2 F-POSS:50% PVA-TFAA] in paint Tips tested (in order of hardness): CS-8<CS-10<<H-18
Number of rubs: 0, 30, 60, 90, 120, and 150 (for H-18) or 180 (for CS-8 and CS10)
Rate of rubbing: 30 cycles/min Contact angles for water were measured using a Krauss DSA100S drop shape analyzer with an automatic syringe dispenser in 5 uL volumes. Each surface was measured after each cycle of abrasion then allowed to dry fully before the next abrasion cycle was performed. Images of the rubbed surfaces were taken under optical microscope with a 50× magnification after 120 cycles.

Rubbing with the harshest H-18 tip resulted in stripping away the paint almost entirely on the 10% [50% 4/2 F-POSS:50% modified PVA] in paint and slightly less at 25% loading, as seen in as seen in the photographs in FIGS. 13A-F (Abrasion Testing: 120 rubs @ 30 cycles/min). With the much milder CS-8 and CS-10 tips, the surfaces stayed quite smooth even after 180 rubs.

Figure 14:
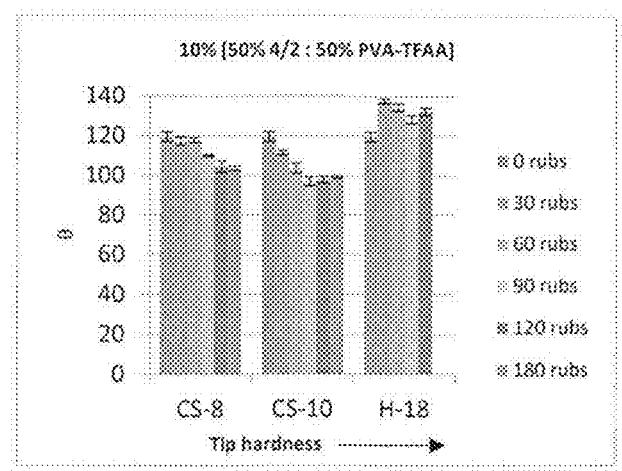
FIG. 14 is a chart of contact angles for different rubbing as part of abrasion resistance testing of the 10% mixture of 4/2 F-POSS blended with TFAA-modified PVA in paint of FIGS. 13A-C.
Figure 15:
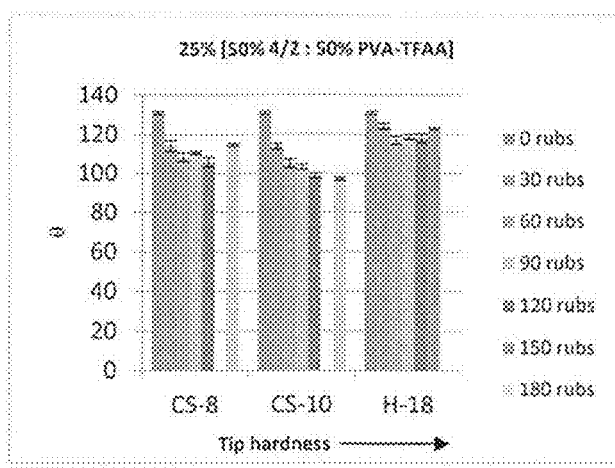
FIG. 15 is a chart of contact angles for different rubbing as part of abrasion resistance testing of the 25% mixture of 4/2 F-POSS blended with TFAA-modified PVA in paint of FIGS. 13D-F.
Figures 16A, 16B:
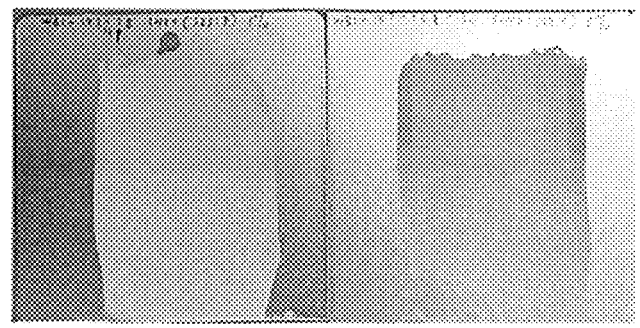
FIGS. 16A-D are photographs of steel plates coated with a paint containing a synthetic blend F-POSS and TFAA-modified PVA, (FIG. 16A at 1%, FIG. 16B at 5%, FIG. 16C at 10% and FIG. 16D at 25%).
Figures 16C, 16D:
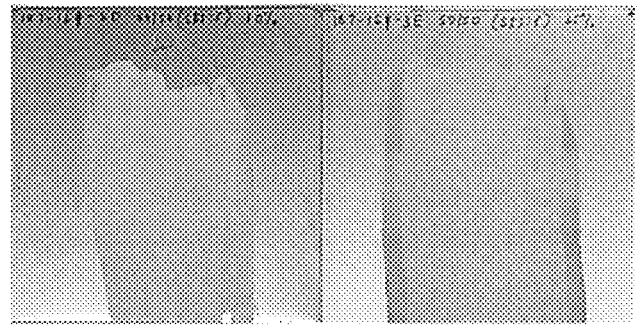

The contact angles for each rubbing were plotted for each of the three tips, as shown in FIGS. 14-15.

Abrasion results were similar with 10% and 25% loading of the 4/2 F-POSS:modified PVA in paint as observed with the 6/2 F-POSS:modified PVA. The contact angle on the abraded surface using the softer CS-8 still appears to be leveling off after 180 rubs. A slight decrease was observed after 180 cycles with the CS-10 tip. Use of the harsh H-18 tip on the 25% loading of the 4/2 F-POSS-Polymer formulation in paint yields similar results to the 10% 6/2 F-POSS-Polymer results after 150 cycles. Abrasion of the 10% loading of the 4/2 F-POSS-Polymer formulation in paint with the harsh H-18 tip was not performed due to the amount of exposed steel from the previous 120 cycles.

Example 7

Synthesis of 6/2:4/2 Fluorinated Polyhedral Oligomeric Silsesquioxane (F-POSS) Synthetic Blends Example 7A Synthesis of Materials Novel proprietary siloxane-caged compounds containing side groups with varying lengths of fluorinated hydrocarbons, essentially a 6/2:4/2 hybrid, were synthesized. For ease of reference, the following nomenclature was used to identify the new synthetic blend (SB) compounds:

SB1: A 3:1 ratio of 1H, 1H, 2H, 2H perfluorooctyltriethoxysilane ("6/2"):1H, 1H, 2H, 2H-Nonafluorohexyltriethoxysilane ("4/2")

SB2: A 1:1 ratio of 1H, 1H, 2H, 2H perfluorooctyltriethoxysilane:1H, 1H, 2H, 2H-Nonafluorohexyltriethoxysilane SB3: A 1:3 ratio of 1H, 1H, 2H, 2H perfluorooctyltriethoxysilane:1H, 1H, 2H, 2H-Nonafluorohexyltriethoxysilane Example 7A(i)

SB1 (Ratio of [75% 6/2]:[25% 4/2])

3.83 g of 1H, 1H, 2H, 2H perfluorooctyltriethoxysilane (Sigma Aldrich, 667420-25 g) and 1.03 g of 1H, 1H, 2H, 2H-Nonafluorohexyltriethoxysilane (TCI America, T2860) (3:1 molar ratio) were taken in 10 mL ethanol, to which was added 0.3 mL of KOH solution (7.4 mg/mL). The mixture was stirred at room temperature for 24 hrs resulting in the precipitation of a white semi-solid product. The solvent in the reaction mixture was decanted, the precipitate washed repeatedly with ethanol, then dried under vacuum oven overnight at 45-50° C. The crude product was then dissolved in AK-225G solvent, and then the organic layer washed three times with ddH$_2$O, dried over anhydrous magnesium sulfate, filtered, concentrated and dried under vacuum overnight at 80° C. The resulting purified product was still a semi-solid substance.

Example 7A(ii)

SB2 (Ratio of [50% 6/2]:[50% 4/2])

2.55 g of the 1H, 1H, 2H, 2H perfluorooctyltriethoxysilane (Sigma Aldrich, 667420-25 g) and 2.05 g of 1H, 1H, 2H, 2H-Nonafluorohexyltriethoxysilane (TCI America, T2860) (1:1 molar ratio) were taken in 10 mL ethanol, to which was added 0.3 mL of KOH solution (7.4 mg/mL). The mixture was stirred at room temperature for 24 h resulting in the precipitation of a white semi-solid product. The solvent in the reaction mixture was decanted, the precipitate washed repeatedly with ethanol, then dried under vacuum overnight at 45-50° C. The crude product was then dissolved in AK-225G solvent, and then the organic layer washed three times with ddH$_2$O, dried over anhydrous magnesium sulfate, filtered, concentrated and dried under vacuum overnight at 80° C. The resulting purified product was still a semi-solid substance.

Example 7A(iii)

SB3 (Ratio of [25% 6/2]:[75% 4/2])

1.28 g of the 1H, 1H, 2H, 2H perfluorooctyltriethoxysilane (Sigma Aldrich, 667420-25 g) and 3.1 g of 1H, 1H, 2H, 2H-Nonafluorohexyltriethoxysilane (TCI America, T2860) (1:3 molar ratios) were taken in 10 mL ethanol, to which was added 0.3 mL of KOH solution (7.4 mg/mL). The mixture was stirred at room temperature for 24 h resulting in the precipitation of a white semi-solid product. The solvent in the reaction mixture was decanted, the precipitate washed repeatedly with ethanol, then dried under vacuum overnight at 45-50° C. The crude product was then dissolved in AK-225G solvent, and then the organic layer washed three times with ddH$_2$O, dried over anhydrous magnesium sulfate, filtered, concentrated and dried under vacuum overnight at 80° C. The resulting purified product was still a semi-solid substance.

Example 8

F-POSS Synthetic Blends With Modified Polyvinyl Alcohol

Example 8A

Formulation of Synthetic Blends With Modified PVA in Paint

Two-component paint was prepared according to manufacturer's directions by mixing Windmastic TopCoat Repair Kit 7035 Grey Part A base paint (Carboline, UN1293) with Windmastic TopCoat Repair Kit Part B Resin (Carboline, UN1866) 6:1(v/v). To ensure accurate measurements of paint, six volumes (mLs) of Part A were weighed several times and the weights averaged 8.6 g; one volume (mL) of Part B was weighed several times averaging 0.97 g. Weight-to-weight ratios were then used throughout each experiment for the formulation of the control paint. The 2 component paint (8.6 g of Part A and 0.97 g of Part B) were added to a Flacktek Speedmixer 10 mL polypropylene translucent container. The paint was then mixed for 10 minutes at 2700 rpm in the Flacktek DAC400 FVZ Speedmixer.

Synthetic blends SB1, SB2 and SB3 were mechanically blended with the modified PVA solution at ratios of 3:1, 1:1 and 1:3, and subsequently loaded from 0 to 25 wt % into paint. The containers, including the paint only control and 100% modified PVA polymer in paint, were then placed into the Flacktek Speedmixer for 10 minutes at 2700 rpm. Each formulation was then coated onto 4"×4" QPanel 0.32 inch Dull matte finish steel plates (Guardco) using a 4 mil coating bar. The plates were dried overnight at room temperature.

No ill effects on the coatings were observed with the incorporation of the synthetic blends with modified PVA polymer in the paint.

Representative images coated steel containing the synthetic blend SB3 with modified PVA are shown in FIGS. 16A-D.

Example 8B

Performance of Synthetic Blends With Modified PVA in Paint

Figure 17:
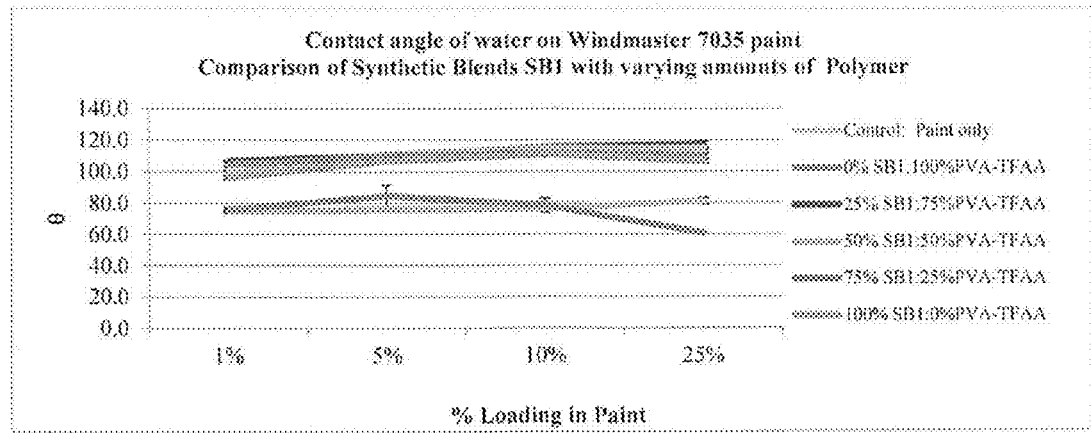
FIG. 17 is a graph of the contact angle of water on paint with varying amounts of a synthetic blend SB1 F-POSS (combined 3:1 ratio of 1H, 1H, 2H, 2H perfluorooctyltriethoxysilane:1H, 1H, 2H, 2H-Nonafluorohexyltriethoxysilane) with different amounts of modified TFAA-modified PVA.
Figure 18:
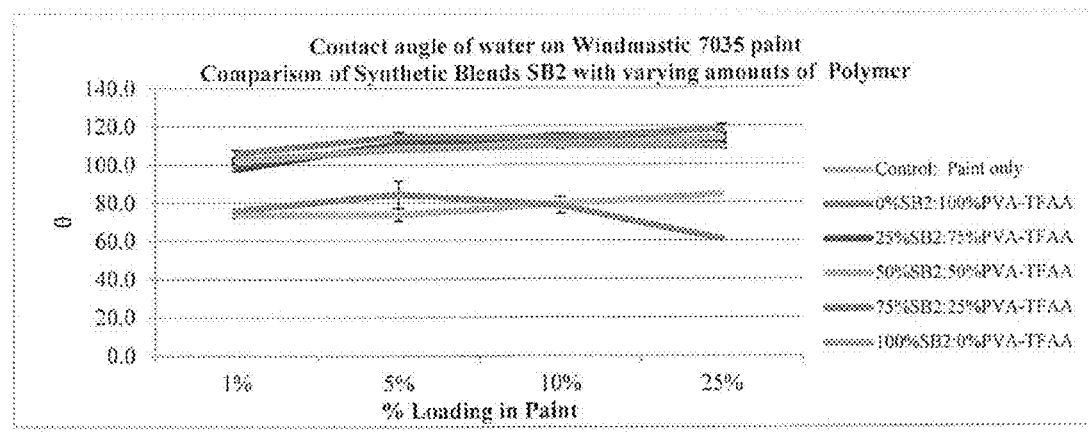
FIG. 18 is a graph of the contact angle of water on paint with varying amounts of a synthetic blend SB2 F-POSS (combined 1:1 ratio of 1H, 1H, 2H, 2H perfluorooctyltriethoxysilane:1H, 1H, 2H, 2H-Nonafluorohexyltriethoxysilane) with different amounts of modified TFAA-modified PVA.
Figure 19:
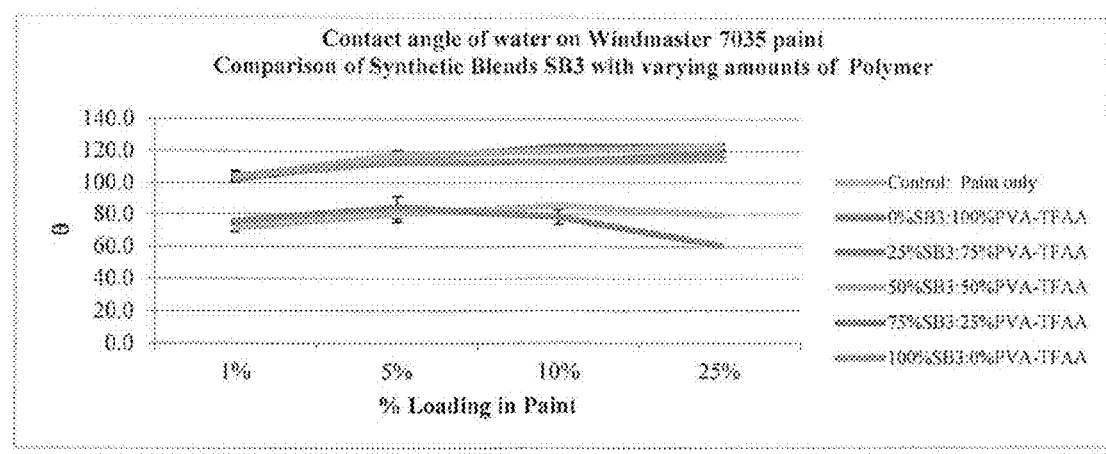
FIG. 19 is a graph of the contact angle of water on paint with varying amounts of a synthetic blend SB3 F-POSS (combined 1:3 ratio of 1H, 1H, 2H, 2H perfluorooctyltriethoxysilane:1H, 1H, 2H, 2H-Nonafluorohexyltriethoxysilane) with different amounts of modified TFAA-modified PVA.

Contact angles of water for the SB1, SB2 and SB3 blends were measured using a Krauss DSA100S drop shape analyzer with an automatic syringe dispenser in 5 uL volumes and are shown in FIGS. 17-19, respectively. Contact angles of hexadecane were measured using the same instrument fitted with a manual syringe dispensing similar volumes.

The results above show the contact angle of water on coatings made from the synthetic blends, each unique compounds synthesized from chemically combined 1H, 1H, 2H, 2H perfluorooctyltriethoxysilane:1H, 1H, 2H, 2H-Nonafluorohexyltriethoxysilane in a 3:1, 1:1 or 1:3 ratio, combined with the modified PVA polymer solution in paint. The results show improvement in the contact angle with the inclusion of the modified PVA over each of the synthetic blends in paint alone. In addition the blend containing SB3, the 1:3 1H, 1H, 2H, 2H perfluorooctyltriethoxysilane:1H, 1H, 2H, 2H-Nonafluorohexyltriethoxysilane (6/2:4/2 precursor), resulted in contact angles greater than 120° when blended with the modified PVA in ratios of 25:75 and 50:50 and loaded into paint at 10 and 25 wt % concentrations. This is an interesting finding because the SB3 compound contains an increased number of 4/2 length side chains than 6/2 and this is the first time that a 4/2 F-POSS compound has performed better than a 6/2 F-POSS compound.

Again, this may have positive implications in creating a more environmentally friendly product due to the reduction in fluorination.

Figure 20:
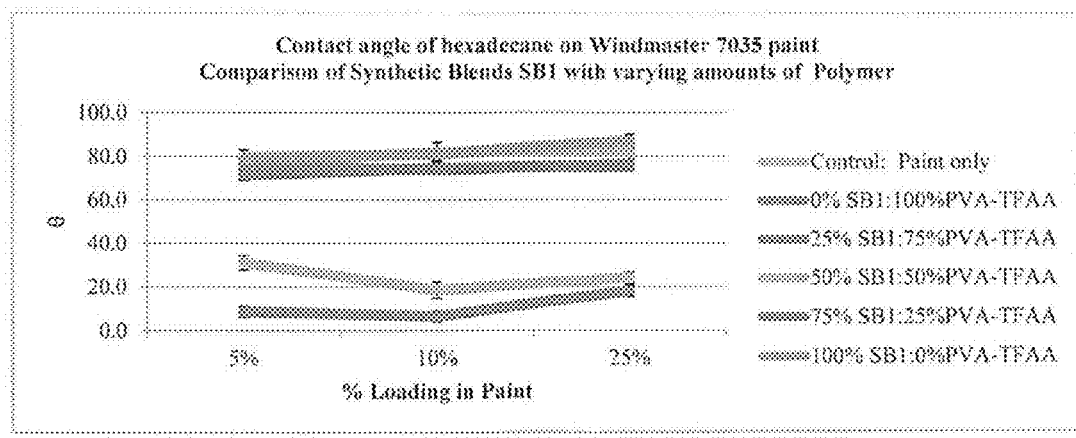
FIG. 20 is a graph of the contact angle of hexadecane on paint with varying amounts of a synthetic blend SB1 F-POSS, combined with the modified PVA polymer solution in paint.
Figure 21:
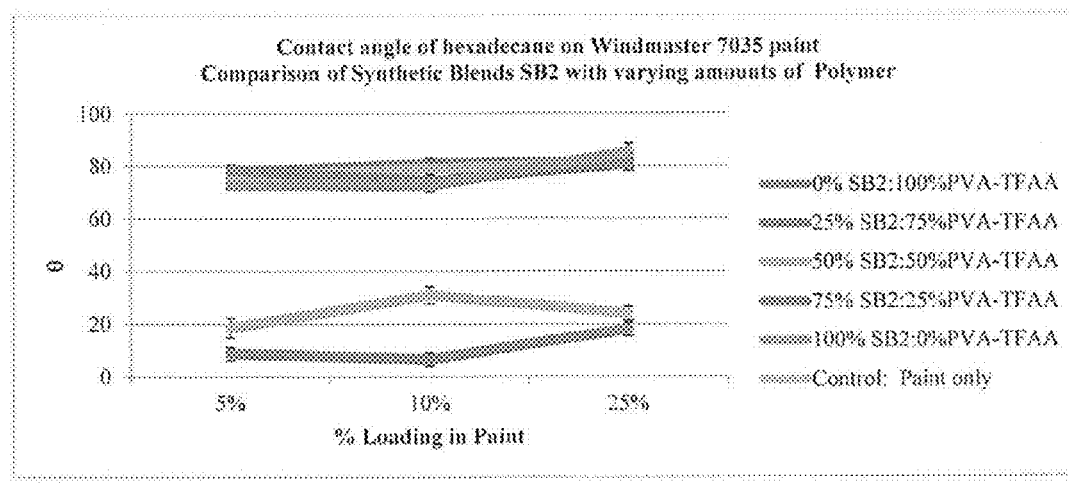
FIG. 21 is a graph of the contact angle of hexadecane on paint with varying amounts of a synthetic blend SB2 F-POSS, combined with the modified PVA polymer solution in paint.
Figure 22:
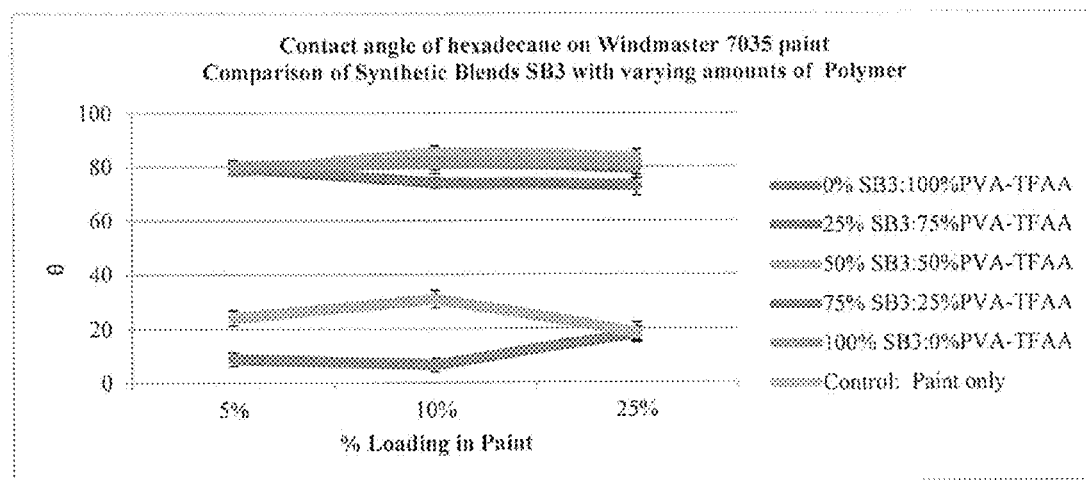
FIG. 22 is a graph of the contact angle of hexadecane on paint with varying amounts of a synthetic blend SB3 F-POSS, combined with the modified PVA polymer solution in paint.
Figure 23A:
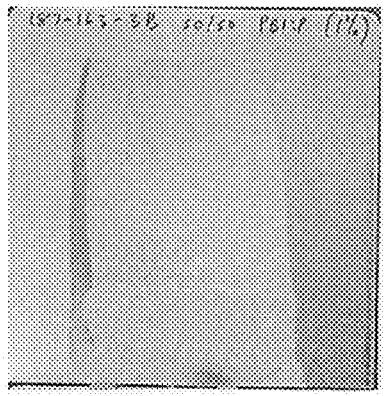
FIG. 23A is a photograph of a steel plate coated with a paint containing a 50:50 ratio of PB1:TFAA-modified PVA, where PB1 is a physical blend of F-POSS materials at 1%.
Figure 23B:
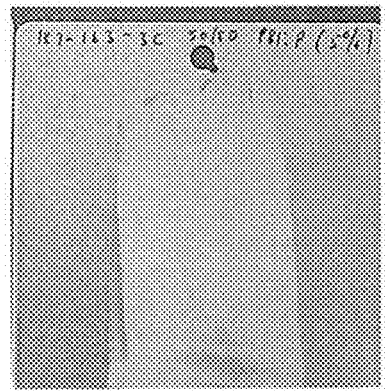
FIG. 23B is a photograph of a steel plate coated with a paint containing a 50:50 ratio of PB1:TFAA-modified PVA, where PB1 is a physical blend of F-POSS materials at 5%.
Figure 23C:
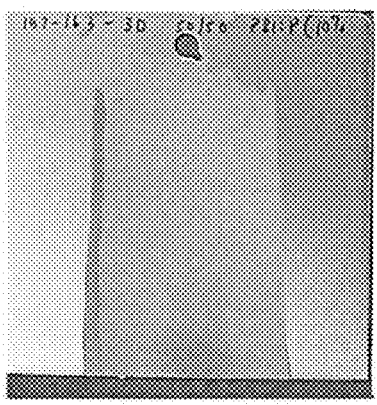
FIG. 23C is a photograph of a steel plate coated with a paint containing a 50:50 ratio of PB1:TFAA-modified PVA, where PB1 is a physical blend of F-POSS materials at 10%.
Figure 23D:
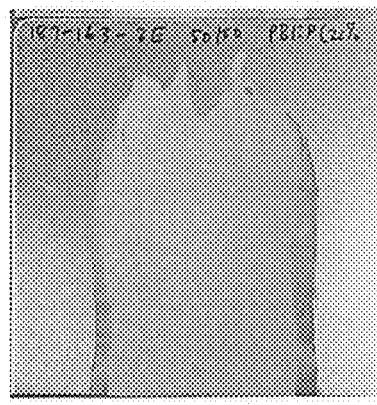
FIG. 23D is a photograph of a steel plate coated with a paint containing a 50:50 ratio of PB1:TFAA-modified PVA, where PB1 is a physical blend of F-POSS materials at 25%.

The results in FIGS. 20-22 show the contact angle of hexadecane on coatings made from the synthetic blends, each unique compounds synthesized from chemically combined 1H, 1H, 2H, 2H perfluorooctyltriethoxysilane:1H, 1H, 2H, 2H-Nonafluorohexyltriethoxysilane in a 3:1, 1:1 or 1:3 ratio, combined with the modified PVA polymer solution in paint. The results show similar contact angle with the inclusion of the modified PVA to each of the synthetic blends in paint alone. Each of the synthetic blends also show an increase in hexadecane contact angle over both 6/2 FPOSS+/−polymer and 4/2 FPOSS+/−polymer.

Example 9

6/2:4/2 F-POSS Physical Blends With Modified Polyvinyl Alcohol

Example 9A

Formulation of Physical Blends With Modified PVA in Paint

Two-component paint was prepared according to manufacturer's directions by mixing Windmastic TopCoat Repair Kit 7035 Grey Part A base paint (Carboline, UN1293) with Windmastic TopCoat Repair Kit Part B Resin (Carboline, UN1866) 6:1(v/v). To ensure accurate measurements of paint, six volumes (mLs) of Part A were weighed several times and the weights averaged 8.6 g; one volume (mL) of Part B was weighed several times averaging 0.97 g. Weight-to-weight ratios were then used throughout each experiment for the formulation of the control paint. The 2 component paint (8.6 g of Part A and 0.97 g of Part B) were added to a Flacktek Speedmixer 10 mL polypropylene translucent container. The paint was then mixed for 10 minutes at 2700 rpm in the Flacktek DAC400 FVZ Speedmixer.

6/2 and 4/2 F-POSS compounds were physically blended together using varying % weight ratios into 4 containers per blend. For physical blend 1 (PB1), approximately 0.075 g of 6/2 F-POSS and 0.025 g of 4/2 F-POSS were weighed into 10 mL Speedmixer polypropylene containers and mechanically blended together. For physical blend 2 (PB2), approximately 0.05 g of 6/2 F-POSS and 0.05 g of 4/2 F-POSS were weighed into containers and blended. For physical blend 3 (PB3), approximately 0.025 g of 6/2 F-POSS and 0.075 g of 4/2 F-POSS were combined as described.

For each physical blend made above, modified PVA polymer solution was added at 3:1, 1:1 and 1:3 ratios and mechanically blended. Subsequently each was loaded into paint at 0, 1, 5, 10 and 25%. The containers, including the paint only control and 100% modified PVA polymer in paint, were then placed into the Flacktek Speedmixer for 10 minutes at 2700 rpm. Each formulation was then coated onto 4"×4" QPanel 0.32 inch Dull matte finish steel plates (Guardco) using a 4 mil coating bar. The plates were dried overnight at room temperature.

Interestingly, adding 1% of any of the physical blends, with and without modified PVA, to the paint caused a mottled effect in the paint coating that was not observed at the higher loading concentrations. FIGS. 23A-D are images of coated steel containing 50:50 PB1:modified PVA at each weight % loading in paint.

Example 9B

Performance of Physical Blends With Modified PVA in Paint

Contact angles of water were measured using a Krauss DSA100S drop shape analyzer with an automatic syringe dispenser in 5 uL volumes. Contact angles of hexadecane were measured using the same instrument fitted with a manual syringe dispensing similar volumes.

The results show that the hydrophobicity of the paint surface containing the physical blends PB2 and PB3 (1:1 and 1:3 6/2:4/2 F-POSS, respectively) with modified PVA out-performed any of the prior formulations reaching contact angles of 125-130° at 25% loading in paint.

Figure 24:
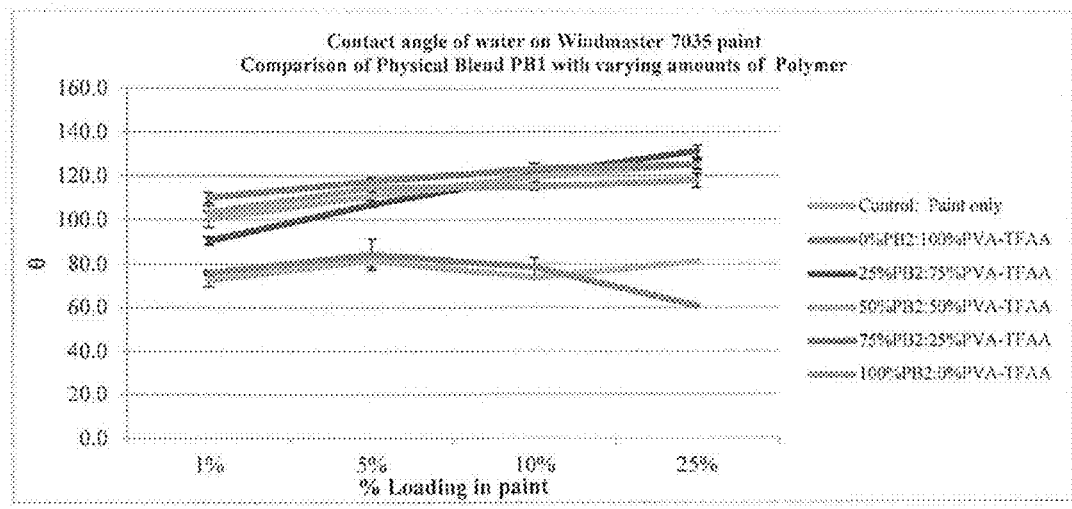
FIG. 24 is a graph of the contact angle of water on paint with varying amounts of PB1 with different amounts of modified TFAA-modified PVA.
Figure 25:
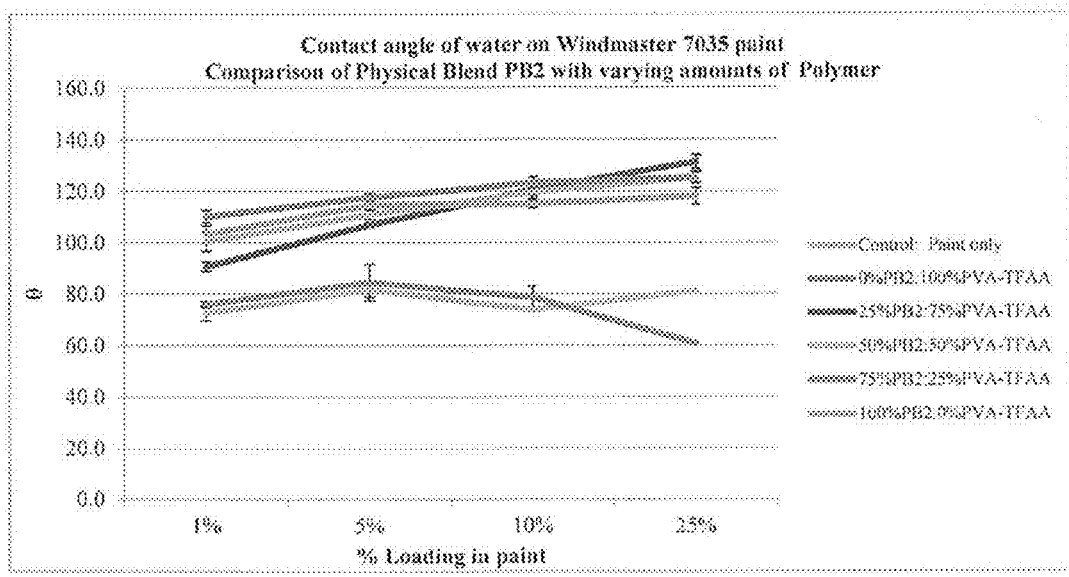
FIG. 25 is a graph of the contact angle of water on paint with varying amounts of PB2 with different amounts of modified TFAA-modified PVA.
Figure 26:
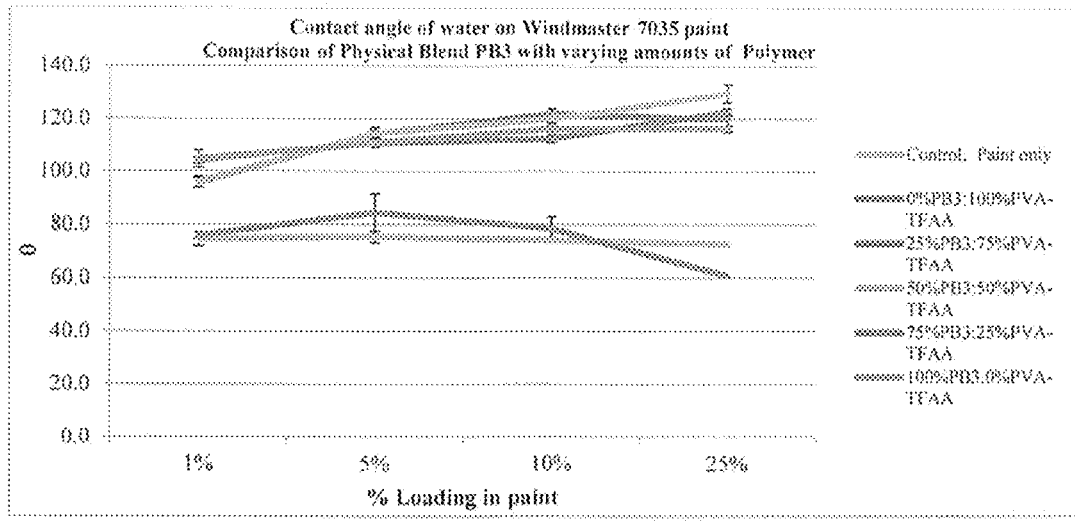
FIG. 26 is a graph of the contact angle of water on paint with varying amounts of PB3 with different amounts of modified TFAA-modified PVA.

FIG. 24 shows the contact angle of water on Windmaster 7035 paint with varying amounts of PB1 with and without polymer. FIG. 25 shows the contact angle of water on Windmaster 7035 paint with varying amounts of PB2 with and without polymer. FIG. 26 shows the contact angle of water on Windmaster 7035 paint with varying amounts of PB3 with and without polymer.

Figure 27:
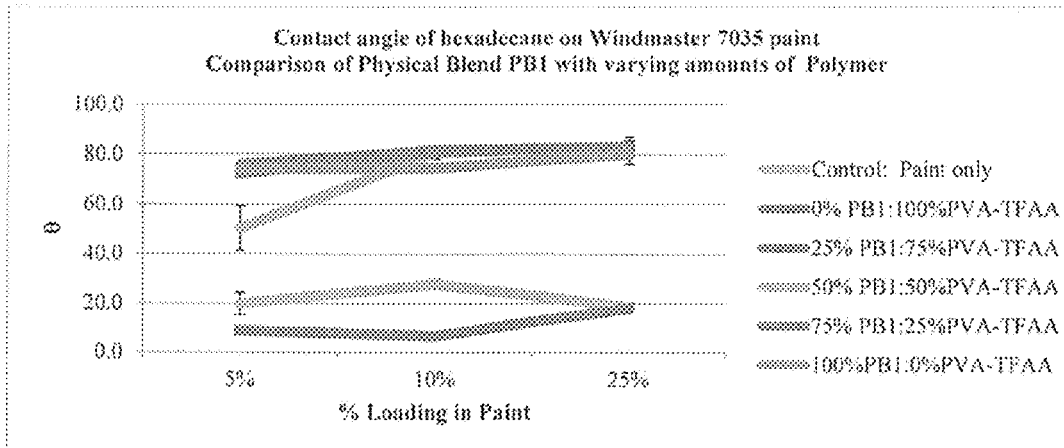
FIG. 27 is a graph of the contact angle of hexadecane on paint with varying amounts of PB1 with different amounts of modified TFAA-modified PVA.
Figure 28:
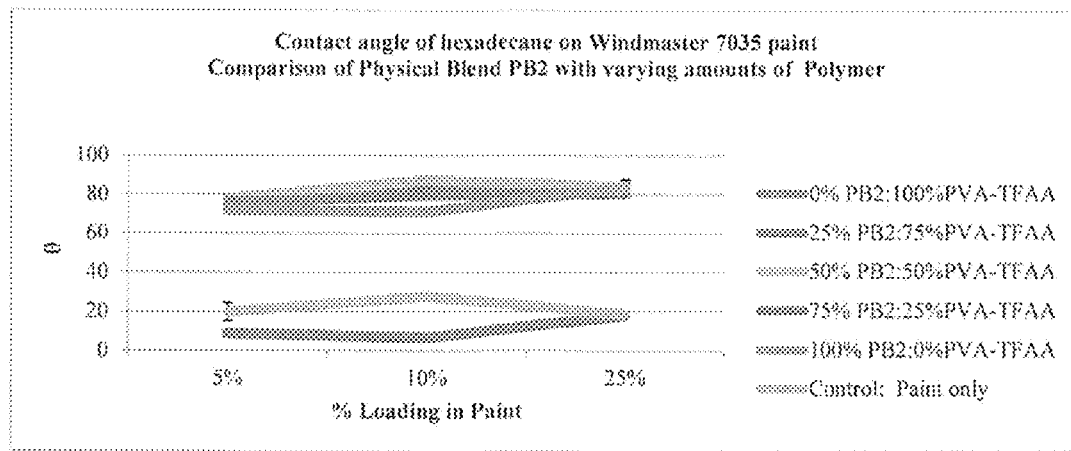
FIG. 28 is a graph of the contact angle of hexadecane on paint with varying amounts of PB2 with different amounts of modified TFAA-modified PVA.
Figure 29:
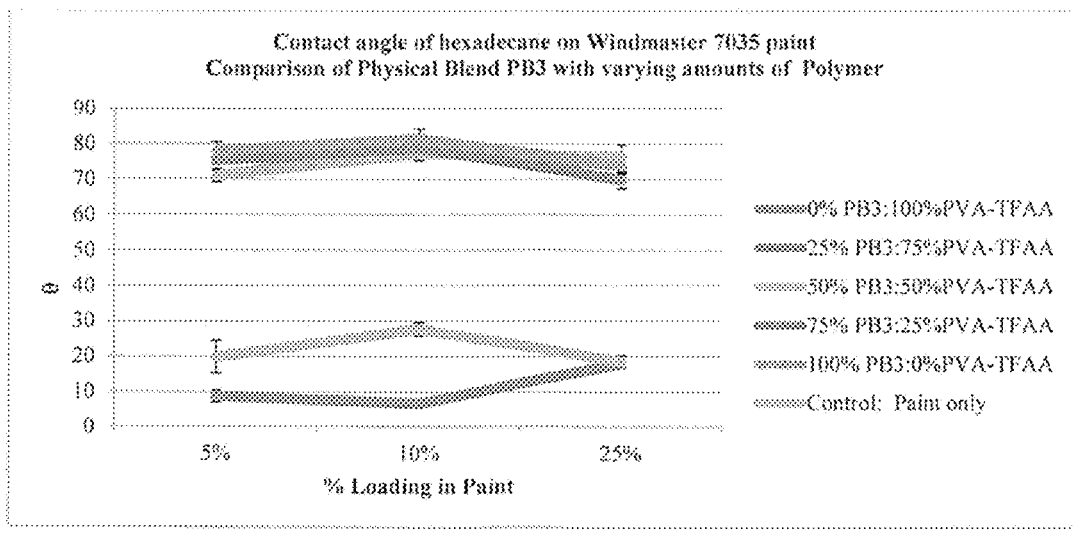
FIG. 29 is a graph of the contact angle of hexadecane on paint with varying amounts of PB3 with different amounts of modified TFAA-modified PVA.

FIG. 27 shows the contact angle of hexadecane on Windmaster 7035 paint with varying amounts of PB1 with and without polymer. FIG. 28 shows the contact angle of hexadecane on Windmaster 7035 paint with varying amounts of PB2 with and without polymer. FIG. 29 shows the contact angle of hexadecane on Windmaster 7035 paint with varying amounts of PB3 with and without polymer.

The trend is similar to that observed with the synthetic blends with modified PVA where the blends containing higher concentrations of 4/2 F-POSS performed slightly better.

The results show similar contact angle with the inclusion of the modified PVA to each of the physical blends in paint alone. Each of the physical blends also show an increase in hexadecane contact angle over both 6/2 F-POSS with and without polymer, and 4/2 F-POSS with and without polymer.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. The word "exemplary" or "illustrative" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. A composition, comprising: a copolymer of polyvinyl alcohol and trifluoro acetaldehyde.

2. The composition of claim 1, wherein the composition further comprises an F-POSS material.

3. A composition comprising: poly (4,6-methylenyl-1,3-dioxan-2-trifluormethyl)-vinylalcohol.

4. The composition of claim 2, wherein the F-POSS material comprises 6/2 F-POSS.

5. The composition of claim 2, wherein the ratio of copolymer to F-POSS in the composition is 1:1.

6. The composition of claim 2, further comprising a polyurethane paint system.

7. The composition of claim 6, wherein the polyurethane paint system comprises 90% of the composition.

8. A composition according to claim 1, wherein the copolymer of polyvinyl alcohol and trifluoro acetaldehyde has the formula:

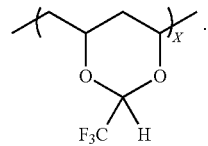

* * * * *